(12) United States Patent
Kim

(10) Patent No.: US 6,308,242 B1
(45) Date of Patent: Oct. 23, 2001

(54) APPARATUS FOR ADAPTIVELY CONTROLLING A PREFETCH QUEUE BASED ON VARIOUS FLUSH CONDITIONS

(75) Inventor: Hyun Eun Kim, Kyoungki-do (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/104,542

(22) Filed: Jun. 26, 1998

(30) Foreign Application Priority Data

Jun. 26, 1997 (KR) .................................................. 97-27900

(51) Int. Cl.$^7$ ..................................................... G06F 12/00
(52) U.S. Cl. .......................... 711/135; 711/137; 712/205; 712/207
(58) Field of Search ..................................... 711/135, 137, 711/133, 134, 146, 159, 204, 213; 712/205, 207

(56) References Cited

U.S. PATENT DOCUMENTS

| | | | |
|---|---|---|---|
| 5,317,720 | * | 5/1994 | Stamm et al. ........................ 711/143 |
| 5,515,521 | * | 5/1996 | Whitted, III et al. ................... 711/3 |
| 5,606,675 | | 2/1997 | Sakamura et al. ..................... 712/237 |
| 5,724,549 | * | 3/1998 | Selgas et al. ........................ 711/141 |
| 6,021,485 | * | 2/2000 | Feiste et al. ......................... 712/216 |

* cited by examiner

Primary Examiner—Matthew Kim
Assistant Examiner—Matthew D. Anderson
(74) Attorney, Agent, or Firm—Jacobson Holman, PLLC

(57) ABSTRACT

A microprocessor has an external memory for storing data and includes an internal cache for storing program data to be executed and for generating a first flush signal; a prefetch queue for storing a series of instructions contained in the program; a decode block for decoding the instructions and for generating a second flush signal; a buffer; and a control block, in response to the first flush signal, for storing an address and a state of instructions to be flushed into the buffer and, in response to the first flush signal and a third flush signal from an external device, for generating a queue flush signal to thereby flush the prefetch queue.

7 Claims, 2 Drawing Sheets

APPARATUS FOR ADAPTIVELY CONTROLLING A PREFETCH QUEUE BASED ON VARIOUS FLUSH CONDITIONS

FIELD OF THE INVENTION

The present invention relates to a microprocessor; and, more particularly, to an improved prefetch control unit which is capable of effectively providing an improved prefetch operation based on various flush conditions.

DESCRIPTION OF THE PRIOR ART

A high performance microprocessor, such as a superscalar processor, is generally provided with a cache and a prefetch buffer or a prefetch queue in order to fetch instructions stored in an external main memory in a more effective manner. In this case, the performance of the processor can be improved by employing the cache and the prefetch buffer, while, since the complexity of the microprocessor is increased thereby, it is further difficult to control the complex elements such as the cache and the prefetch queue of the microprocessor. Referring to FIG. 1, there is shown a simplified block diagram of memory hierarchy which includes a main memory, a cache and a prefetch queue. The operational speed is gradually increased from the main memory to the prefetch queue, while the storage size is gradually increased from the prefetch queue to the main memory. The internal cache has an intermediate storage size and operational speed in comparison with the main memory and the prefetch queue. Although, in order to improve the performance of the microprocessor, the increased prefetch buffers can be employed therein, it is not a cost-effective manner because the cost of the prefetch buffer is relatively high. Therefore, in order to implement an optimum performance of the microprocessor in comparison with the cost thereof, it is needed to adjust a constructional ratio of three memory elements, i.e., the main memory, the internal cache and the prefetch queue.

An instruction fetch operation of the microprocessor is generally meant that, in order to execute the program, the instructions stored in a memory are sequentially read out from the memory. That is, since the instructions are stored in the memory in a series manner according to the execution sequence, the instructions can be sequentially fetched therefrom by continuously increasing the memory address therefor. On the other hand, an instruction prefetch operation thereof means that data, e.g., a series of instructions, contained in a program sequence to be executed are previously read out from the main memory and stored in the prefetch buffer having a higher operational speed capability.

However, during the sequential execution of the instructions, various flush conditions, in which the sequential execution is not required, are of frequent occurrence. The various flush conditions include a branch condition for executing a branch instruction, a segment limit violation or page fault condition, an external interrupt condition, a snoop hit condition and the like. In these case, the process is escaped from the current program sequence and goes to a newly designated program to be executed by using a newly provided address representing thereof. When there is no prefetch operation, it is merely required to change the program sequence. However, when the prefetch operation is used in the execution of the program sequence, i.e., the prefetch buffer is provided in the microprocessor, at some times, it is required that processing the flush condition should not be concurrent with the occurrence thereof. Therefore, it is needed that a decision circuit for dealing with the above problem is provided to the microprocessor having a prefetch buffer. When the program sequence changes, upon the decision from the decision circuit, invalid instructions prefetched and stored in the prefetch buffer is needed to be flushed and newly selected contents or instruction should be then prefetched and stored in the prefetch buffer.

Furthermore, it is desirable that a pipelined fetch and decode stage of the microprocessor is provided with means for determining whether the content stored in the prefetch buffer is valid.

SUMMARY OF THE INVENTION

It is, therefore, an object of the invention to provide an apparatus, for use in a microprocessor having a prefetch queue which is capable of effectively providing an adaptive control of a prefetch queue based on various flush conditions.

In accordance with one aspect of the present invention, there is provided a microprocessor having an external memory for storing data, comprising: an internal cache for storing program data to be executed and for generating a first flush signal; a prefetch queue for storing a series of instructions contained in the program; a decode block for decoding the instructions and for generating a second flush signal; a buffer; and a control block, in response to the first flush signal, for storing an address and a state of instructions to be flushed into the buffer and, in response to the first flush signal and a third flush signal from an external device, for generating a queue flush signal to thereby flush the prefetch queue.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
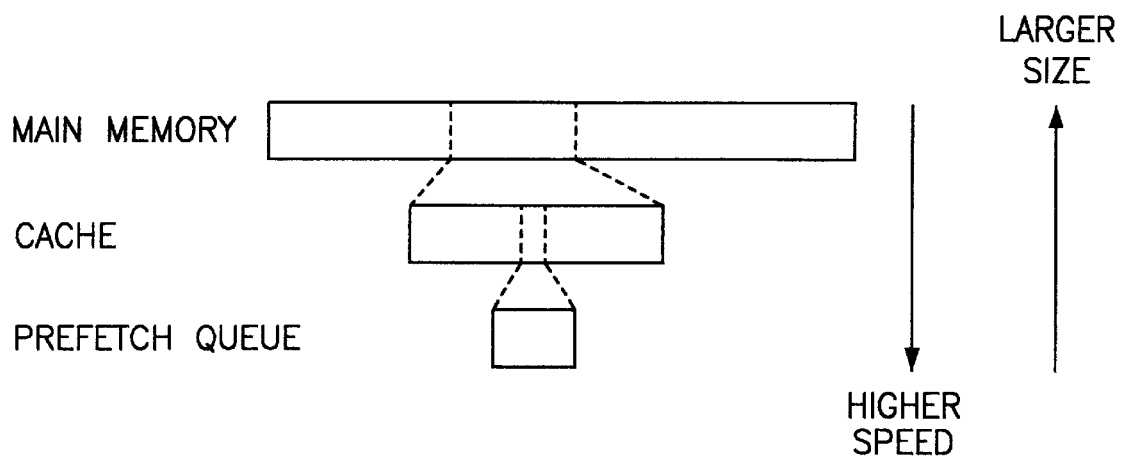
FIG. 1 shows a simplified block diagram of a conventional memory hierarchy.
Figure 2:
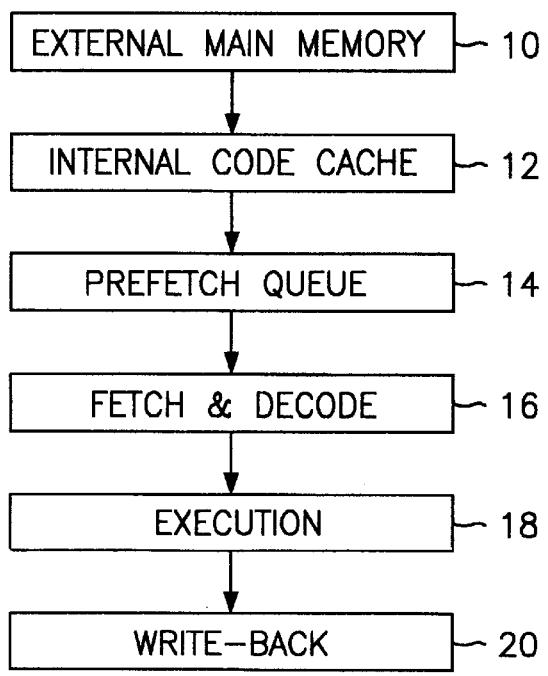
FIG. 2 discloses a schematic block diagram of a microprocessor having a prefetch queue.

Referring to FIG. 2, there is shown a basic block diagram of a microprocessor based on the flow of instructions. The microprocessor includes an external main memory 10, an internal code cache 12, a prefetch queue 14, a fetch and decode block 16, an execution block 18 and a write-back block 20.

When a program to be executed is determined or selected, corresponding data stored in the main memory 10 is read out therefrom and stored in the internal code cache 12. Instructions contained in the corresponding data are then sequentially prefetched and stored in the prefetch queue 14 which has a higher speed capability than that of the internal code cache 12. In this case, the instruction data stored in the prefetch queue 14 are identical to those of the internal code cache 12 which are also identical to that of the main memory 10 in order to exactly execute the selected program.

The fetch and decode block 16 sequentially receives the instructions from the prefetch queue 14 and decode the instructions. The decoded instructions are executed by the execution block 18 which generate an execution result. The execution result is then written back into the memory through the use of the write back block 20.

In this case, the flush conditions can be classified as following three types: a first flush condition is that there is no relation to the prefetch queue 14 and the flush condition is required to be immediately processed; a second flush condition is that the flush condition occurs at the prefetch operation and is required to be processed in the fetch and decode block 16; and a third flush condition is that the flush condition occurs at the decoding operation (there is no relation to the prefetch queue 14 and is required to be immediately processed.

Figure 3:
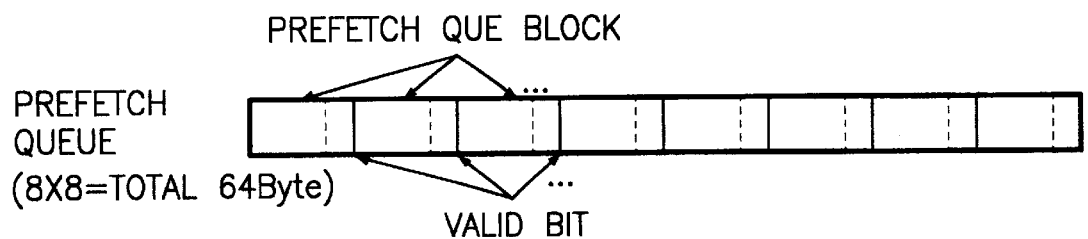
FIG. 3 illustrates a block diagram of a prefetch queue in accordance with the present invention.
Figure 4:
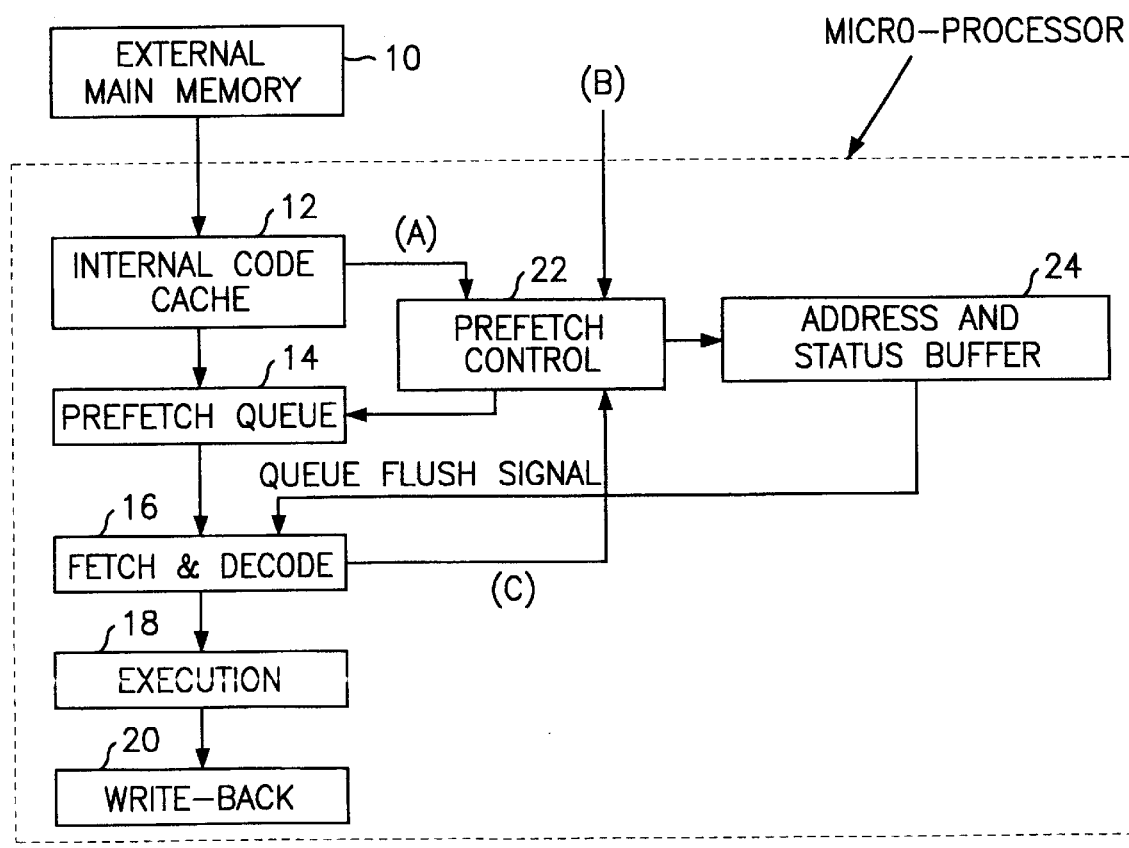
FIG. 4 provides a detailed diagram of a microprocessor having a prefetch control block in accordance with the present invention.

In the first and the third flush conditions, at the occurrence of the conditions, the prefetch queue 14 is immediately flushed. Referring to FIG. 4, in order to process the second flush condition, the microprocessor includes a buffer for storing a status and an address representing the instruction data to be flushed. The fetch and decode block 16 serves to monitor the status and the address stored in the buffer to thereby determine when the prefetch queue 14 should be flushed. Furthermore, the prefetch queue 14 includes a number of valid bits, each representing whether corresponding instruction data stored in the prefetch queue 14 is valid. When the prefetch queue 14 is flushed, the valid bits are cleared. The valid bits are set during the prefetch operation and, When the instructions stored in the prefetch queue 14 are sequentially fed to the fetch and decode block 16, the valid bits corresponding to the fetched data are then sequentially cleared. Although, the valid bits are generally assigned to the instruction data stored in the prefetch queue 14 on a byte by a byte basis, each valid bit can be assigned to a preferred size of the instruction data. Assuming that the preferably sized instruction data is defined as a prefetch queue data block, in the microprocessor having 64-bit data bus, the prefetch queue data block can include 8 byte data, while, in the microprocessor having 32 bit data bus, the prefetch queue data block can contain 4 byte data. Therefore, referring to FIG. 3, there is an exemplary diagram of the prefetch queue 14, wherein the size of the prefetch queue 14 is of 64 bytes and the prefetch queue data block includes 8 byte data.

Referring to FIG. 4, there is illustrated a block diagram of the microprocessor in accordance with the present invention. The microprocessor includes the external main memory 10, the internal code cache 12, the prefetch queue 14, the fetch and decode block 16, the execution block 18, the write-back block 20, a prefetch control block 22 and an address and status buffer 24.

When a program to be executed is determined or selected, corresponding data stored in the main memory 10 are read out therefrom and stored in the internal code cache 12. The prefetch queue data blocks contained in the corresponding data are then sequentially prefetched from the internal code cache 12 and stored in the prefetch queue 14. The internal code cache 12 also generates a first flush signal A when the flush operation is required in the fetch and decode block 16. A second flush signal B is generated by external devices as an interruption when an immediate flush operation is required, and directly coupled to the prefetch control block 22.

The fetch and decode block 16 sequentially receives the instructions from the prefetch queue 14 and decode the instructions. The fetch and decode block 16 also generates a third flush signal C when the immediate flush operation is required. The execution block 16 receives the decoded instructions to thereby perform the operation according to the decoded instructions and generate an execution result. The write back block 22 receives the execution result to write in the external memory 10.

The prefetch control block 22 receives the first to the third flush signals A, B and C to generate a queue flush signal which is coupled to the prefetch queue 14.

When the flush operation is required in the fetch and decode block 16, the first flush signal A is issued from the internal code cache 12. In response to the first flush signal A, an address and a status thereof are stored in the address and status buffer 24 under the control of the prefetch control block 22.

The fetch and decode block 16 monitors the address and the status to determine when the flush operation is required. When the flush operation is required, the fetch and decode block 16 generate the third flush signal C which is relayed to the prefetch control block 22.

The prefetch queue 14 receives the queue flush signal to clear all of the valid bits contained in the prefetch queue blocks. As shown in FIG. 3, there are 8 number of valid bits and, therefore, 8 number of clear signals are required. On the other hand, in order to determine whether the instruction is valid, it is not required to check whether the flush signal is issued.

In this case, the instruction valid check process can be performed by checking the valid bits of the prefetch queue blocks containing the instruction to be checked. Through the use of the instruction valid check process, when the instruction is valid, the decoding operation in the fetch and decode block 14 can proceed and, when the instruction is invalid, the decoding does not proceed until a new instruction sequence is prefetched and stored in the prefetch queue 14.

In order to check the valid bits, a valid bit of the prefetch queue block having the start byte of the instruction is ANDed with a valid bit of the prefetch queue block containing the last byte of the instruction.

As can be seen from the above, the prefetch control block in accordance with the present invention can provide an adaptive control of a prefetch queue based on various flush conditions in an effective manner. Furthermore, since the valid bits are used in the checking whether the instructions stored in the prefetch queue are valid, the valid check process can be simplified. Further, since a status and an address for the instruction to be flushed can be stored in the buffer in accordance with the present invention, the time when the flush operation is performed can be controlled by the fetch and decode block.

While the present invention has been shown and described with reference to the particular embodiments, it will be apparent to those skilled in the art that many changes and modifications may be made without departing from the spirit and scope of the invention as defined in the appended claims.

What is claimed is:

1. A microprocessor having an external memory for storing data, comprising:

an internal cache for storing program data to be executed and for generating a first flush signal;

a prefetch queue for storing a series of instructions contained in the program;

decode means for decoding the instructions and for generating a second flush signal;

a buffer; and control means, in response to the first flush signal, for storing an address and a state of instructions to be flushed into the buffer and, in response to the first flush signal and a third flush signal from an external device, for generating a queue flush signal to thereby flush the prefetch queue.

2. The microprocessor as recited in claim 1, wherein the decode means monitors the address and the state stored in the buffer and determines when a flush operation is required to thereby generate the third flush signal.

3. The microprocessor as recited in claim 2, wherein the internal cache determines when the flush operation is required at a decoding operation to thereby generate the first flush signal.

4. The microprocessor as recited in claim 1, wherein the series of instructions includes a plurality of prefetch queue data block and each of the prefetch queue data blocks includes a valid bit.

5. The microprocessor as recited in claim 4, wherein the valid bit is set at a prefetch operation and, in response to the flush signal, is cleared.

6. The microprocessor as recited in claim 5, wherein, in order to check whether a fetched instruction is valid, a valid bit of a fetch queue data block having a first byte of the fetched instruction is ANDed with a valid bit of a fetch queue data containing a last byte of the fetched instruction.

7. The microprocessor as recited in claim 6, wherein a size of the fetch queue data block is predetermined based on a size of data bus.

* * * * *